Patented Aug. 31, 1926.

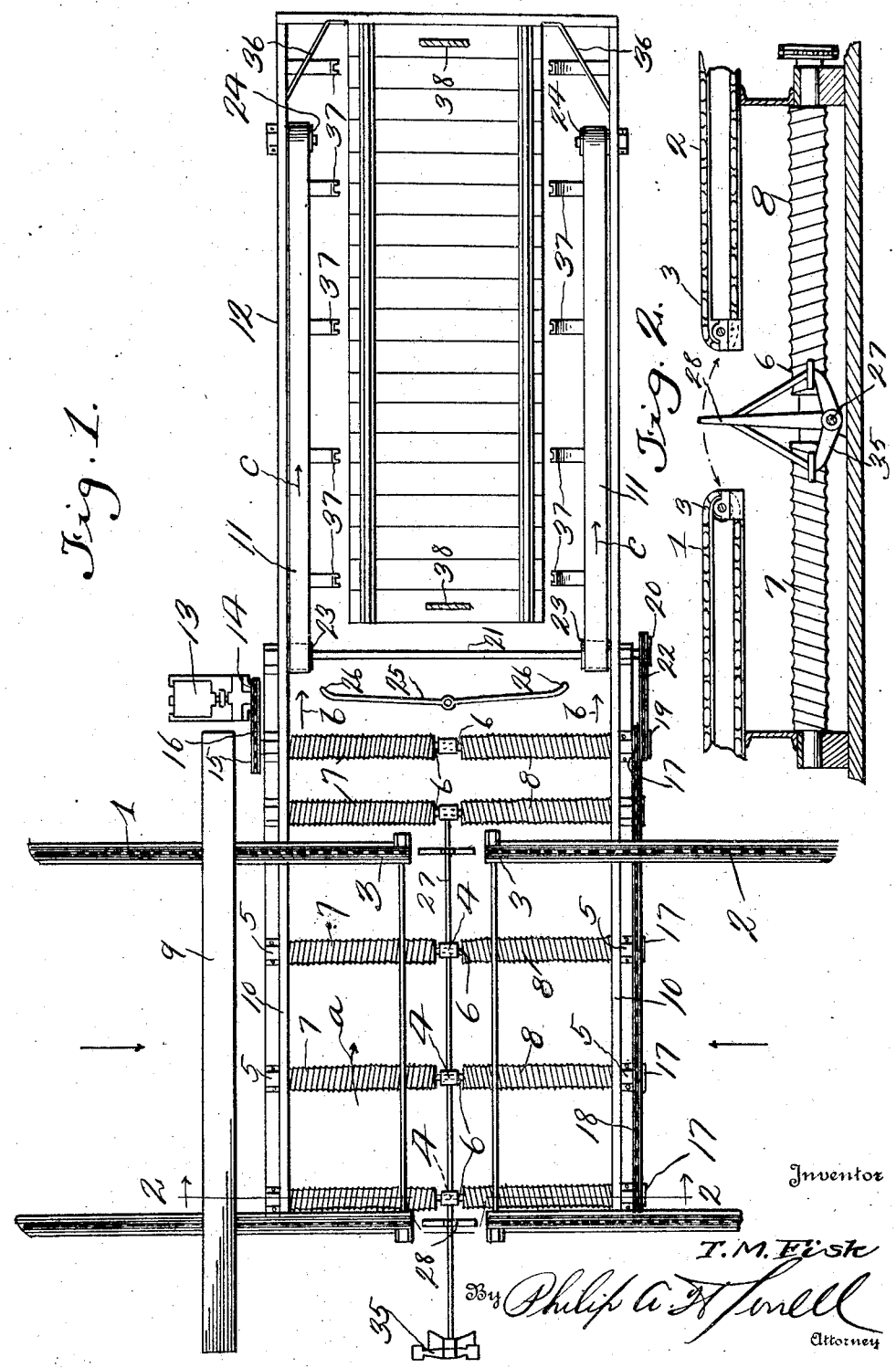

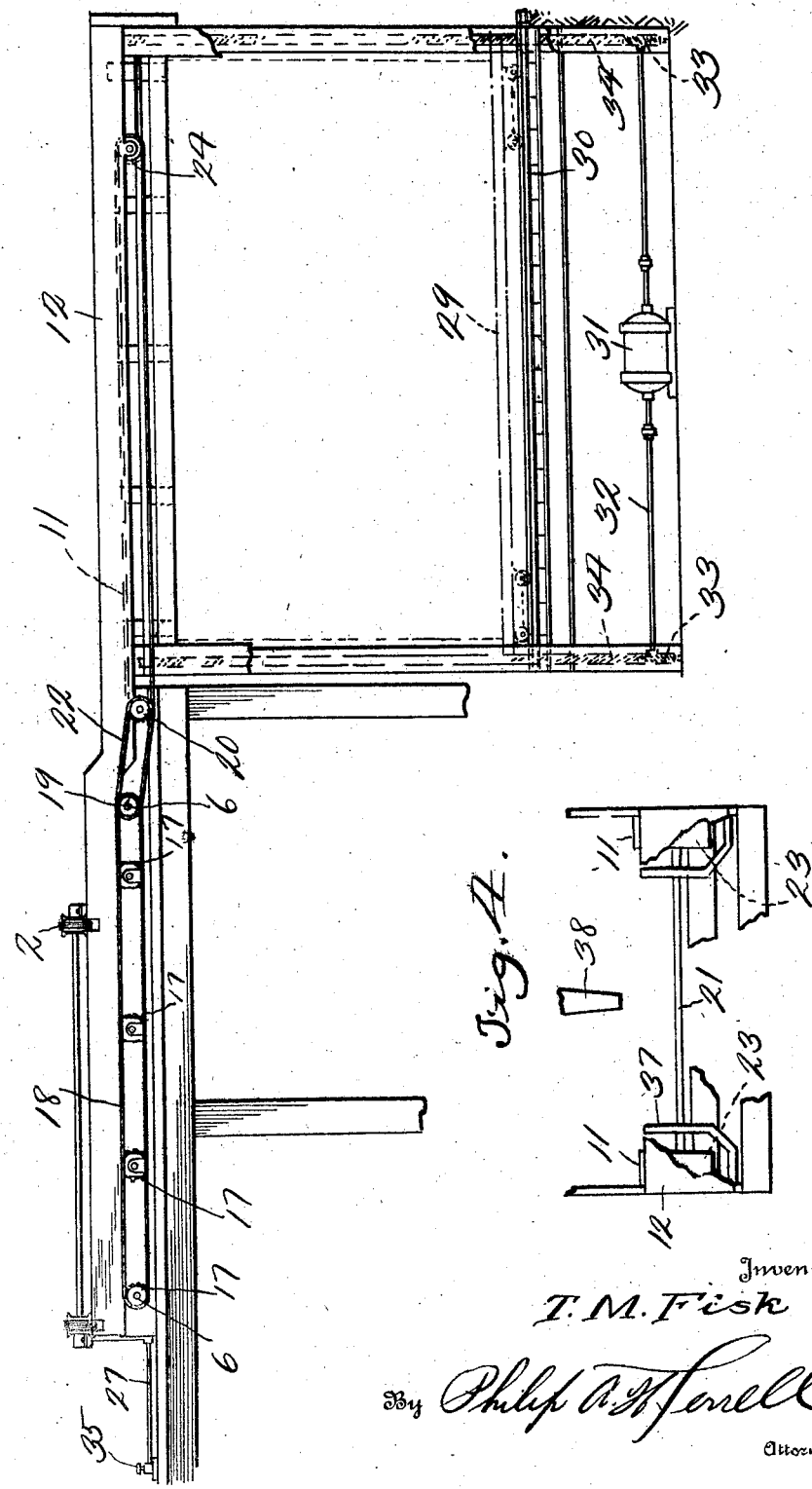

1,597,778

UNITED STATES PATENT OFFICE.

TRAVIS MORSE FISK, OF LONGVIEW, WASHINGTON.

LUMBER-PILING MACHINE.

Application filed April 3, 1926. Serial No. 99,572.

The invention relates to lumber piling machines and has for its object to provide a device of this character whereby lumber may be quickly conveyed to and piled on a kiln truck so that the trucks can be quickly loaded and moved to a kiln.

A further object is to provide a lumber piling machine comprising a frame having transversely disposed parallel spirally ribbed rollers, having right and left hand thread, and onto which rollers boards are discharged at right angles to the rollers by conveyors in parallel relation to the rollers whereby said boards, when deposited on the rollers, will be first moved outwardly against the side of the frame and then moved longitudinally on the belt conveyors by the rotation of the rollers.

A further object is to provide a driving motor driving one of the rollers, sprocket and chain connections between the rollers and the belt conveyors and forming means whereby the rollers and belt conveyors will be operated from a single source of power.

A further object is to provide between the inner roller and the belt conveyors a transversely disposed plate against which the ends of the boards engage for preventing longitudinal movement of the boards on the rollers as they are fed outwardly to a position where they engage the outer sides of the frame and are in position to be moved longitudinally onto the belt conveyors.

A further object is to provide between the adjacent ends of the board feeding conveyors a longitudinally disposed rock shaft having deflecting members, which deflecting members may be moved to positions where boards discharged from either feeding conveyor will be discharged onto either side of the road.

A further object is to provide deflecting members adjacent the belt conveyors whereby boards fed rearwardly on the belt conveyors will be deflected inwardly onto the truck.

A further object is to provide a lumber handling device whereby boards may be discharged into the device from either side thereof and delivered to either side of a kiln truck as desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a top plan view of the lumber handling machine.

Figure 2 is a transverse sectional view taken on line 2—2 of Figure 1.

Figure 3 is a side elevation of the machine.

Figure 4 is a rear elevation of a portion of the kiln car elevator frame.

Referring to the drawings, the numerals 1 and 2 designate alined feed conveyors which are horizontally disposed and which have their ends 3 adjacent each other. Disposed beneath the adjacent ends of the conveyors 1 and 2, and rotatably mounted in bearings 4 and 5 are transversely disposed parallel shafts 6, which shafts 6 rotate in the direction of the arrow $a$, Figure 1, and at opposite sides of the bearings 4 are enlarged and provided with opposed spiral ribs 7 and 8, and which ribs during the rotation of the shafts 6 engage the under side of a board 9, after it is deposited thereon and feed said board outwardly against the side rails 10 of the frame of the machine where the boards are stopped in their side movement and the further rotation of the shafts 6 move the board longitudinally in the direction of the arrows $b$, and onto the belt conveyors 11 at opposite sides of the kiln car frame 12. Disposed adjacent the device is a conventional form of motor 13, which motor is provided with a drive sprocket 14, and over the drive sprocket 14 and a sprocket 15 carried by one of the shafts 6, a sprocket chain 16 extends. The outer ends of the rollers 6 are provided with sprockets 17, and over which sprockets a sprocket chain 18 extends, therefore it will be seen that all the shafts 6 will be simultaneously rotated in the direction of the arrow $a$ for feeding the boards as they are deposited on the ribbed portions of the shafts outwardly and then longitudinally. The shaft 6 adjacent the elevator or truck frame 12 is provided with a second sprocket 19, and over the sprocket 19 and a sprocket 20 carried by a transversely disposed shaft 21, a sprocket chain 22 extends, therefore it will be seen that during the operation of the rollers or shafts 6, the belt conveyors will be moved in the direction of the arrows c through the medium of the pulleys 23 carried by the transversely disposed shaft 21. The endless belt conveyors 11 also extend over idle pulleys 24 adjacent the rear end of the frame 12. During the transverse movement of the boards 9, said boards are held against longitudinal movement incident to the rotation of the shafts 6 by means of a transversely disposed plate 25, which plate has its ends 26 terminating adjacent the inner sides of the belt conveyors 11, therefore it will be seen as soon as the board is moved outwardly by the rotation of the shaft 6, to a position where it is substantially in alinement with either of the belt conveyors 11, the outward movement of the board is stopped and the continued rotation of the spirally ribbed shaft 6 will move the board longitudinally onto the belt conveyors 11. It will be seen that the movable parts of the device are operated from a single source of power and the boards are delivered on the belt conveyors 11 in a horizontal position where they can be easily handled for flat piling on a kiln car.

The feeding conveyors 1 and 2 may be of any construction desired, however they are preferably horizontally disposed and have their adjacent ends in spaced relation and above the shafts 6 as clearly shown in Figure 2. Disposed beneath the shafts 6 is a rock shaft 27, which rock shaft is provided with an upwardly extending arm 28, which arm is adapted to be moved into engagement with either of the adjacent ends 3 of the feed conveyors 1 and 2 for deflecting boards discharging from either of the feed conveyors 1 and 2 onto either of the portions 7 or 8 of the shafts 6, thereby allowing boards fed from the feed conveyor 1, if desired to be discharged onto the portions 8 of the shafts or from the feed conveyor 2 onto the portions 7 of the shafts. The advantage of this transferring is that the kiln car 29, which is carried by a conventional form of elevator 30 may be flat piled on one side thereof, and then on the other, or entirely flat piled in courses from opposite sides of the device. The elevator 30 may be operated in any suitable manner, for instance by a motor 31 having a drive shaft 32, which has gear connections 33 with members 34, which carry the elevator, however applicant does not limit himself to any particular type or construction of elevator. One end of the rock shaft 27 is provided with a double foot pedal 35, on which the operator places his foot for shifting the deflecting arms 28 into and out of cooperative relation with the adjacent ends of the feed conveyors 1 and 2.

The rear end of the elevator frame 12 is provided with deflecting plates 36, against which the ends of the board engage as they are moved longitudinally on the belt conveyors 11, and which plates 36 start the boards to a position over the kiln truck 29. A single operator is used, who is preferably provided with a hook, and which operator manipulates the hook for moving the boards into position on the truck. As the flat piling operation continues the truck 29 is moved downwardly, therefore it will be seen that courses of boards may be easily and quickly formed in superimposed relation. Extending upwardly at opposite sides of the elevator frame 2 are oppositely disposed guide channels 37, which receive the ends of conventional spacing strips which are placed between the courses of boards and by providing the channels 37 the spacing strips can be accurately positioned. In kiln drying lumber the lumber is stacked to form a central chimney, all of which is old in the art, and which chimney allows a continuous circulation of heated air according to the type of kiln, and to form this chimney members 38 are provided against opposite sides of which boards are placed during the stacking operation, consequently a central chimney is formed in the stack of lumber on the kiln car.

From the above it will be seen that a flat piling lumber machine is provided which may be operated by two men, one adjacent the elevator and one adjacent the feeding conveyors. It will also be seen that the handling of the boards is reduced to a minimum and said boards are conveyed inwardly, deposited on the shafts 6, moved laterally outwardly and then longitudinally onto the belt conveyors 11 and at opposite sides of the elevator and shafts where they may be easily moved onto kiln car, and the stacking and handling is rapid, thereby allowing the cheaper grades of lumber to be flat stacked and kiln dried, without materially adding to the cost of the same, and obviating the edge stacking now in use.

The invention having been set forth what is claimed as new and useful is:—

1. A lumber piling machine comprising a kiln car elevator, feeding conveyors extending towards each other adjacent one end of the elevator, transversely disposed rotatable rollers beneath the adjacent ends of the feeding conveyor, right and left hand feeding ribs carried by said rollers and forming means whereby a board deposited thereon will be fed transversely while in longitudinal position, stops adjacent the ends of the rollers, belt conveyors at opposite sides of the elevator, means for rotating said rollers and belt conveyors, a transversely disposed deflecting plate adjacent the inner ends of the belt conveyors and forming means whereby boards are prevented from longitudinal movement until they reach the stops, said stops cooperating with the rotating rollers whereby boards are moved longitudinally onto the belt conveyors.

2. A lumber handling machine comprising a frame, transversely disposed rotatable ribbed shafts carried by said frame, said shafts being provided with right and left handed ribs, means for depositing boards on said shafts, a kiln car elevator, endless conveyors at opposite sides of the elevator and at an angle to the transversely disposed rollers and in alinement with the ends of said rollers, and a transversely disposed deflecting plate adjacent one of the ends of the conveyors and terminating adjacent the inner sides of the endless conveyors.

3. The combination with a flat piling lumber machine comprising a frame, transversely disposed lateral and longitudinal feed rollers carried by said frame, feed conveyors above the rollers, said feed conveyors terminating adjacent each other and adjacent the centers of the rollers, of pivoted members pivoted below the adjacent ends of the feed conveyors, said pivoted members cooperating with the ends of the feed conveyors and forming means whereby boards from the feed conveyors will be deposited on either of the ends of the feed rollers.

4. The combination with a lumber handling machine comprising a frame, transversely disposed feed rollers carried by said frame and having their opposite ends provided with right and left hand feed ribs, feed conveyors above the rollers, the adjacent ends of the feed conveyors terminating adjacent each other, of means whereby boards from either of the feed conveyors may be deposited on either the right or the left hand ribbed portions of the rollers, said means comprising a rock shaft, upwardly extending arms carried by said rock shaft, said upwardly extending arms being positioned whereby their free ends may be moved into and out of engagement with the adjacent ends of the feed conveyors.

5. The combination with a kiln car elevator, of means for feeding boards to opposite sides of said elevator, said means comprising alined feed conveyors, feed rollers between the adjacent ends of said feed conveyors, feed ribs carried by said rollers, said ribs of each roller being right and left handed, said rollers forming means whereby a board is fed transversely and laterally, means for limiting the lateral transverse movement of the boards, endless conveyors at opposite sides of the elevator, means for preventing longitudinal movement of the boards on the rollers until they are in alinement with the endless conveyors, and means cooperating with the adjacent ends of the feed conveyors whereby boards may be deposited on either end of the feed rollers from either conveyor.

6. The combination with a flat piling machine for piling lumber on a kiln car, of means for moving boards inwardly from opposite sides of the machine, means for moving boards laterally outwardly, means for preventing longitudinal movement outwardly of the boards during their lateral outward movement and means cooperating with the boards for moving the same longitudinally after their lateral outward movement.

7. The combination with a lumber piling machine having adjacent feeding conveyors disposed above right and left handed ribbed rotatable feed rolls, of means cooperating with the adjacent ends of the feeding conveyors whereby lumber may be discharged onto either end of the rolls.

In testimony whereof I hereunto affix my signature.

TRAVIS MORSE FISK.